(12) United States Patent
Wittkopp et al.

(10) Patent No.: US 7,694,793 B2
(45) Date of Patent: Apr. 13, 2010

(54) ONE-WAY CLUTCH WITH DOG-CLUTCH AND SYNCHRONIZER

(75) Inventors: Scott H. Wittkopp, Ypsilanti, MI (US);
James M. Hart, Belleville, MI (US);
Clinton E. Carey, Monroe, MI (US)

(73) Assignee: GM Global Technology Operations, Inc,, Detroit, MI (US)

( * ) Notice: Subject to any disclaimer, the term of this patent is extended or adjusted under 35 U.S.C. 154(b) by 527 days.

(21) Appl. No.: 11/622,597

(22) Filed: Jan. 12, 2007

(65) Prior Publication Data

US 2008/0047798 A1 Feb. 28, 2008

Related U.S. Application Data

(60) Provisional application No. 60/823,159, filed on Aug. 22, 2006.

(51) Int. Cl.
*F16D 23/06* (2006.01)
(52) U.S. Cl. .................. 192/53.34; 192/48.6
(58) Field of Classification Search .............. 192/53.34; 475/324
See application file for complete search history.

(56) References Cited

U.S. PATENT DOCUMENTS

| | | | | |
|---|---|---|---|---|
| 2,498,856 | A * | 2/1950 | Iavelli | 192/45 |
| 5,069,079 | A * | 12/1991 | Vandervoort | 74/339 |
| 6,811,010 | B1 * | 11/2004 | Armstrong | 192/48.91 |
| 2005/0241903 | A1 * | 11/2005 | Rebholz | 192/53.361 |

* cited by examiner

*Primary Examiner*—Richard M. Lorence
(74) *Attorney, Agent, or Firm*—Quinn Law Group, PLLC

(57) ABSTRACT

A clutch assembly is provided for use in a vehicle having an automatic transmission, the assembly including a clutch-apply piston and an integrated one-way clutch, dog clutch apply plate, and synchronizer clutch having a synchronizer plate and a rotating synchronizer cone. The clutch assembly is actuated by a clutch-apply piston configured to axially displace the dog clutch apply plate, thereby engaging the synchronizer plate with the rotating synchronizer cone to synchronize the respective speeds of the synchronizer plate and dog clutch apply plate during a gear shifting event. Upon speed synchronization, continued axial displacement of the clutch-apply piston completes engagement of the dog clutch apply plate to achieve a coast gear state. A return spring provides a return spring force for disengaging the clutch apply piston to permit selection of an alternate gear state during a subsequent gear shifting event.

13 Claims, 2 Drawing Sheets

ONE-WAY CLUTCH WITH DOG-CLUTCH AND SYNCHRONIZER

CROSS REFERENCE TO RELATED APPLICATION

This application claims the benefit of U.S. Provisional Application No. 60/823,159, filed Aug. 22, 2006, which is hereby incorporated by reference in its entirety.

TECHNICAL FIELD

The present invention relates to a vehicle transmission having a clutch assembly with an integral one-way clutch, synchronizer clutch, and dog clutch apply plate operable for holding a transmission torque capacity during coasting and reverse rotational conditions.

BACKGROUND OF THE INVENTION

In a vehicle having an automatic transmission, a rotating-type clutch assembly may be used as a torque-transmitting device for smoothly engaging or coupling a rotating engine crankshaft with a stationary driveshaft to thereby transmit torque from the crankshaft to the vehicle drive wheels. Likewise, the same clutch assembly is used to subsequently disengage the coupled shafts to interrupt the power transfer between the shafts and permit, for example, smooth shifting between the various gears of a planetary gear set. Clutch assemblies or clutches are typically positioned within a separate housing contained within an outer transmission case. Clutches are actuated or engaged using a clutch-apply mechanism such as a piston, which is commonly energized by a controllable supply of pressurized hydraulic fluid. A reduction in clutch-apply pressure releases or disengages the clutch, with the disengagement of the clutch often assisted by a biasing spring or other return mechanism, and likewise, an increase in the clutch-apply pressure will actuate or engage the clutch.

A common rotating-type clutch is a one-way clutch, which as the name implies is specially designed to hold or retain a rotating force or torque in only one direction of rotation, and freely rotate or "freewheel" in the opposite direction, thus enabling relatively smooth and efficient gear shifting. However, due to the inherent inability of a one-way clutch to hold torque in two rotational directions, a redundant clutch, commonly referred to as a "coast clutch", may be employed in tandem with the one-way clutch specifically to hold or retain the torque in the opposite or reverse rotational direction, such as during vehicle coasting and under certain reverse rotational conditions. As an alternative to a redundant coast clutch, a selective one-way clutch may be used. However, selective clutching devices may not be optimal for synchronizing the disparate relative rotational speeds of the outer and inner clutch races, which if not optimally synchronized may adversely affect gear shifting smoothness and efficiency, and/or impart high impact loading.

SUMMARY OF THE INVENTION

Accordingly, a clutch assembly is provided for use in a vehicle having an automatic transmission, the clutch assembly including a clutch-apply mechanism, a one-way clutch, a synchronizer clutch having a synchronizer plate, and a dog clutch apply plate. The clutch assembly is actuated by way of a clutch-apply mechanism which axially displaces a moveable dog clutch apply plate, thereby engaging the dog clutch apply plate with the synchronizer plate. The synchronizer plate in turn synchronizes the respective rotational speeds of the one-way clutch and dog clutch apply plate during initiation of a gear shifting event. Upon sufficient speed synchronization, continued axial displacement of the clutch-apply mechanism completes engagement of the dog clutch apply plate with the one-way clutch to thereby achieve a coasting gear state.

In one aspect of the invention, the synchronizer clutch includes a rotatable cone having at least one friction surface for retarding the rotation of the rotatable cone.

In another aspect of the invention, the synchronizer plate has a plurality of axially-extending teeth that are mutually engageable with a plurality of axially-extending dog clutch apply teeth when the dog clutch apply plate is displaced by the clutch apply mechanism.

In another aspect of the invention, the clutch-apply mechanism is a hydraulically-actuated clutch piston, and the return mechanism is a compressible return spring.

In another aspect of the invention, a vehicle is provided including an automatic transmission, a controller, and a controllable clutch assembly including a one-way clutch, a clutch-apply mechanism, a synchronizer clutch having a synchronizer plate and clutch synchronizer, and a dog clutch having a hub and an apply plate. The clutch-apply mechanism is configured to move the apply plate into engagement with the synchronizer plate in response to the controller, wherein the synchronizer plate is matable with the clutch synchronizer to thereby synchronize the rotational speeds of the one-way clutch and apply plate in order to optimize the gear shifting efficiency of the transmission.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
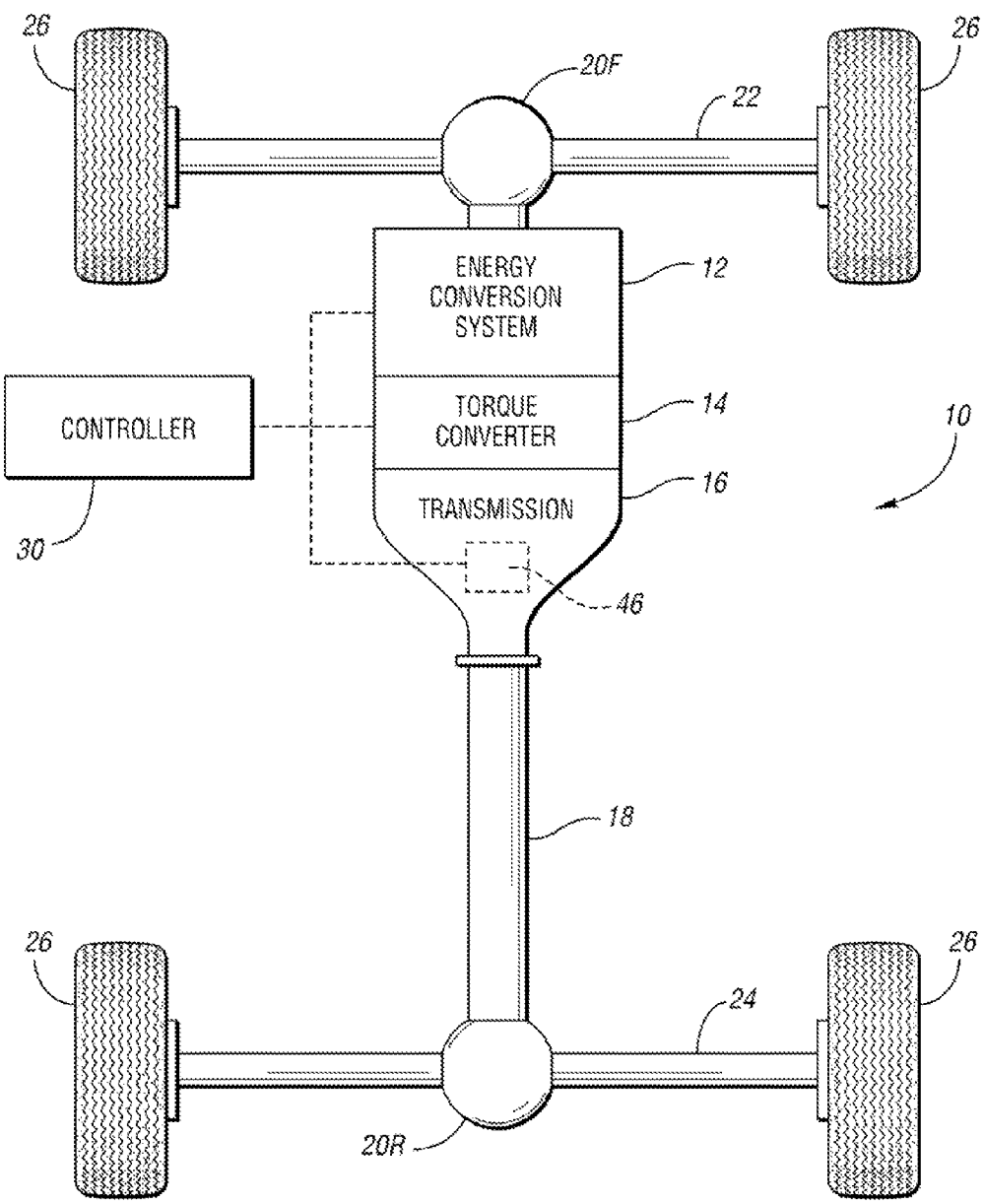
FIG. 1 is a schematic view of a vehicle having an automatic transmission with the clutch assembly according to the invention.

Referring to the drawings wherein like reference numbers correspond to like or similar components throughout the several figures, there is shown schematically in FIG. 1 a vehicle 10 having a plurality of wheels 26 disposed or positioned on opposing ends of a front axle 22 and a rear axle 24. One or both of the axles 22, 24 are powered or driven by an energy conversion system 12 that is engageable with an automatic power transmission 16 through a hydrodynamic torque converter 14. The energy conversion system 12 is preferably a gasoline or diesel-powered internal combustion engine of the type known in the art, but may also include a fuel cell or other voltage source within the scope of the invention. The transmission 16 has a rotatable input member (not shown) and a rotatable output member 18, and includes a controllable clutch assembly 46 of the invention, which is automatically controllable through a controller 30. The controller 30 may control any or all of energy conversion system 12, torque converter 14, and/or transmission 16, including clutch assembly 46. Clutch assembly 46 is shown in FIG. 2, and described in more detail later hereinbelow.

The energy conversion system 12 is operable to generate a rotational force or torque suitable for rotating a crankshaft (not shown) that is selectively connectable or engageable with the input shaft of transmission 16 through the torque converter 14. Depending on whether a front-wheel, rear-wheel, or all-wheel drive configuration is used, one or both of the axles 22 and 24 may be further adapted for use as drive axles suitable for driving or powering the vehicle 10. To this end, a front and/or rear differential 20F, 20R, respectively, may be employed for transmitting output torque from the transmission 16 to either or both of the axles 22, 24, and/or for distributing output torque along a common axle 22 or 24, for example to prevent slippage on slippery pavement or while the vehicle 10 is cornering.

Figure 2:
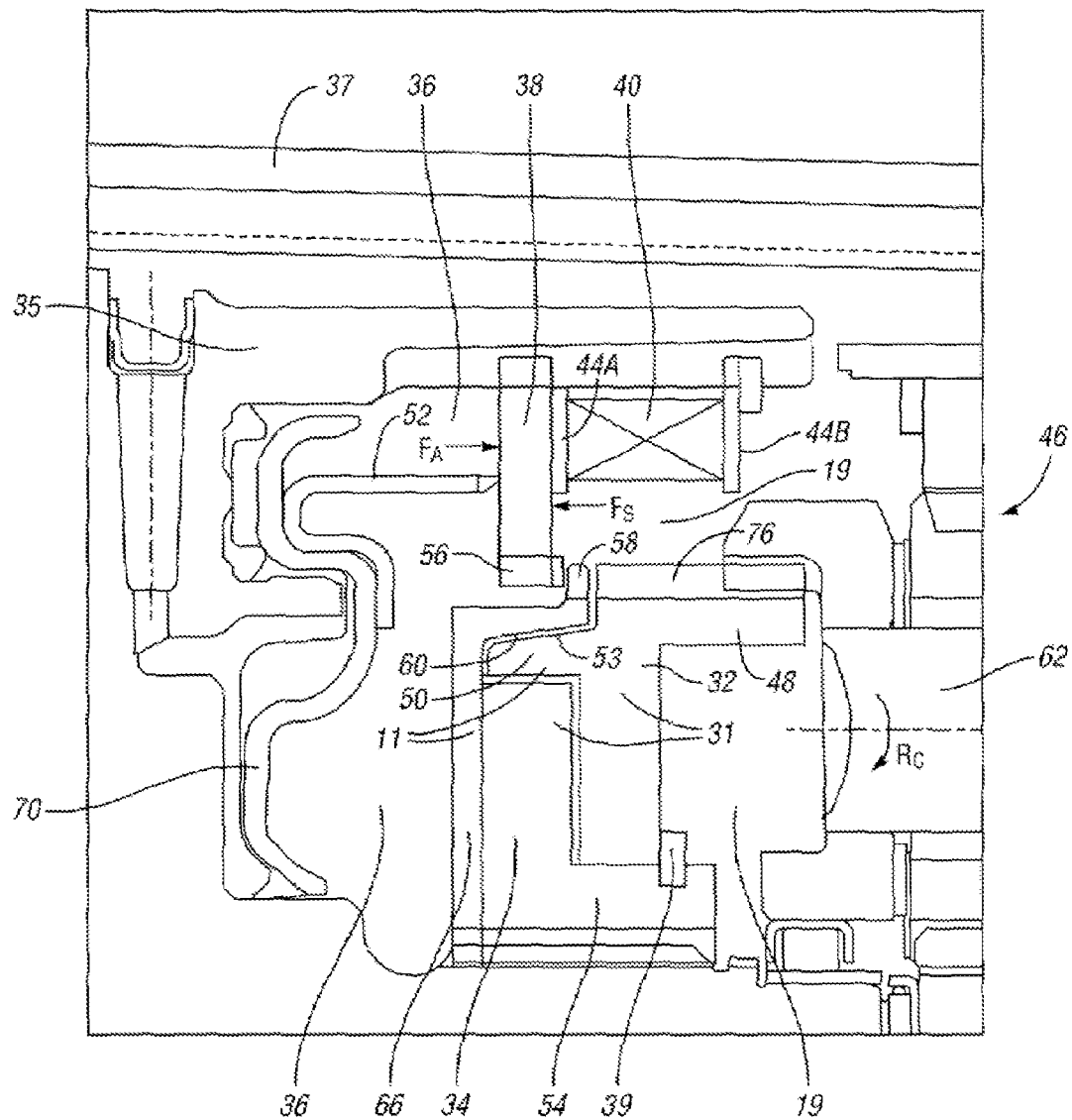
FIG. 2 is a fragmentary cross-sectional view of the clutch assembly of the invention.

Turning to FIG. 2, the controllable clutch assembly 46 is shown within an outer transmission housing or case 37 and a preferably separate inner clutch housing 35. Clutch housing 35 is cast, welded, or otherwise formed to at least partially define a clutch-apply cavity 36 and a main clutch cavity 19. Clutch-apply cavity 36 and main clutch cavity 19 are in fluid communication with a controllable source of pressurized hydraulic fluid, such as a positive displacement pump (not shown), from which the cavities 19 and 36 are preferably kept at a substantially full level of pressurized fluid (not shown).

A moveable clutch-apply mechanism is depicted in FIG. 2 as a preferred clutch-apply piston 70 that is operatively attached to a piston-apply ring 52, with both the clutch-apply piston 70 and the piston-apply ring 52 disposed within the clutch-apply cavity 36. Clutch-apply cavity 36 is at least partially separated from the main cavity 19 by a synchronizer clutch 11 having a synchronizer plate 66 and clutch synchronizer 50, the synchronizer plate 66 further having a plurality of axially-extending synchronizer teeth or upper teeth 58 and a lower face 60. The clutch-apply cavity 36 is further at least partially separated from the main cavity 19 by a separate dog clutch apply plate 38 having a plurality of axially-extending apply teeth or lower teeth 56, with the lower teeth 56 of the dog clutch apply plate 38 and the upper teeth 58 of the synchronizer plate 66 being adapted or configured for complementary or mutual engagement.

The main cavity 19 contains a compressible return spring 40 which is compressed between a pair of substantially rigid spring plates 44A, 44B. The return spring 40 is configured and positioned to apply a biasing or return spring force, represented by arrow $F_S$, to the dog clutch apply plate 38. Main cavity 19 further contains a one-way clutch 31 comprising an upper member 32 and a lower member 34, with each of the respective upper and lower members 32, 34 being retained or positioned with respect to the other by a retainer ring 39. One-way clutch 31 is further operatively connected to a rotating member or carrier 62, with the rate of rotation of carrier 62 represented in FIG. 2 by arrow $R_C$.

Upper member 32 includes an outer race 48, with outer race 48 preferably also adapted to function or operate as a dog clutch hub 48 having a plurality of axially-extending hub teeth 76. For clarity, outer race 48 is referred to hereinafter as dog clutch hub 48. Upper member 32 is operatively attached or connected to a synchronizer cone 50 of the synchronizer clutch 11 having a synchronizer plate 66, as previously described hereinabove. Synchronizer cone 50 is preferably a single cone clutch-synchronizer having an upper friction surface or layer 53 that is coated or otherwise attached to a layer of resilient and conductive friction material operable for slowing and/or stopping the rotation of the synchronizer cone 50 when the synchronizer cone 50 is brought into contact with a relatively stationary opposing object, such as synchronizer plate 66. Lower member 34 is disposed between the synchronizer plate 66 and upper member 32, and includes an inner race 54.

When controller 30 (see FIG. 1), such as a transmission controller, initiates or commands a shifting event such as a downshift or upshift, pressurized fluid (not shown) energizes or actuates the clutch-apply piston 70, thereby moving or sliding clutch-apply piston 70 toward the dog clutch apply plate 38 within the clutch-apply cavity 36. As clutch-apply piston 70 engages with and brings a clutch-apply force (represented by arrow $F_A$) to bear upon the dog clutch apply plate 38, the lower teeth 56 of dog clutch apply plate 38 engage or mesh with the upper teeth 58 of the synchronizer plate 66, thereby moving or sliding the synchronizer plate 66 into meshing engagement with rotating synchronizer cone 50. Although as described herein the preferred clutch apply mechanism is a conventional clutch-apply piston 70, those skilled in the art will recognize that other clutch-apply mechanisms or means may be used to produce the required axial displacement of dog clutch apply plate 38 within the scope of the invention, such as a motorized screw and plate mechanism.

As the upper friction layer 53 of rotating synchronizer cone 50 engages with the lower face 60 of the substantially stationary synchronizer plate 66, the friction forces imparted by the upper friction layer 53 reduce or retard the relative rotational speed of upper member 32 to zero from an initial speed or rotational rate of $R_C$. In this manner, $R_C$ is reduced until the respective rotational speeds of dog clutch apply plate 38 and one-way clutch 31 are fully synchronized. Then, as the clutch-apply piston 70 continues along the path of its axial displacement, the lower teeth 56 of dog clutch apply plate 38 next engage or enmesh with the hub teeth 76 of dog clutch hub 48, effectively grounding the rotating carrier 62 to achieve a "coast" gear state or condition.

Upon release of clutch-apply piston 70, the return spring 40 applies the biasing spring return force, represented by arrow $F_S$, to the dog clutch apply plate 38. Lower teeth 56 of the dog clutch apply plate 38 then un-mesh or disengage with the hub teeth 76 of dog clutch hub 48, thereby allowing the synchronizer plate 66 to return to its initial or disengaged position. Once clutch-apply piston 70 has so disengaged and clutch assembly 31 has resumed rotating in conjunction with carrier 62, alternate gear states may be selected as determined by the controller 30 (see FIG. 1).

For applications utilizing a plate clutch for both "reverse" and "coast" gear states, commonly referred to as a "CBLR clutch", the clutch assembly 46 as previously described hereinabove may be used in lieu of the plate clutch in both reverse and coast braking conditions. Such conditions often require that one rotating element be attached to a stationary member of the transmission, i.e. grounded, to thereby prevent rotation of that element in, for example, first gear, and that the same element be grounded to prevent rotation of that element in the opposite direction during reverse or coast (manual low) conditions.

While the best modes for carrying out the invention have been described in detail, those familiar with the art to which this invention relates will recognize various alternative designs and embodiments for practicing the invention within the scope of the appended claims.

The invention claimed is:

1. A clutch assembly for use in a vehicle having an automatic transmission, the clutch assembly comprising:
a clutch-apply mechanism;
a first clutch having an inner race and an outer race;

a second clutch having a synchronizer plate and a rotatable synchronizer cone, wherein said synchronizer cone is connected to said outer race of said first clutch; and a dog clutch apply plate;

wherein said clutch-apply mechanism axially displaces said dog clutch apply plate to thereby engage said apply plate with said synchronizer plate, thereby moving said synchronizer plate into frictional engagement with said synchronizer cone, and thereby synchronizing the respective rotational speeds of said outer race of said first clutch and said dog clutch apply plate.

2. The clutch assembly of claim 1, wherein said rotatable synchronizer cone has at least one friction surface adapted for engaging a face of the synchronizer plate for retarding the rotation of said outer race.

3. The clutch assembly of claim 1, wherein said clutch-apply mechanism is a hydraulically-actuated clutch piston.

4. The clutch assembly of claim 1, wherein said synchronizer plate has a plurality of axially-extending synchronizer teeth and said apply plate has a plurality of axially-extending apply teeth, said synchronizer teeth and said apply teeth being mutually engageable when said dog clutch apply plate is displaced by said clutch apply mechanism.

5. The clutch assembly of claim 1, further comprising a compressible return spring adapted for applying a return force to said dog clutch apply plate.

6. A clutch assembly comprising:

a clutch-apply mechanism;

an integrated clutch assembly including a first clutch having an inner race and an outer race, a second clutch having a synchronizer plate and a rotatable cone, said cone being connected to said outer race, and a dog clutch having a hub and a dog clutch apply plate; and a return spring operable for applying a return force to said dog clutch apply plate upon release of said clutch-apply mechanism;

wherein said clutch-apply mechanism is configured to axially displace said dog clutch apply plate for engagement of said dog clutch apply plate with said synchronizer plate, wherein said synchronizer plate is frictionally engaged with said cone upon said engagement to thereby synchronize the respective rotational speeds of said outer race of said first clutch and said dog clutch apply plate.

7. The clutch assembly of claim 6, wherein said cone is configured as a single-cone clutch synchronizer.

8. The clutch assembly of claim 6, wherein said outer race is configured to operate as said hub.

9. The clutch assembly of claim 6, wherein said synchronizer plate has a plurality of axially-extending synchronizer teeth and said apply plate has a plurality of axially-extending apply teeth, said synchronizer teeth and said apply teeth being mutually engageable.

10. A vehicle comprising:

an automatic transmission;

a controller; and a controllable clutch assembly including a first clutch having an inner race and an outer race, a clutch-apply mechanism, a second clutch having a synchronizer plate and a synchronizer cone, said synchronizer cone being connected to said outer race, and a dog clutch having a hub and an apply plate;

wherein said clutch-apply mechanism is configured to move said apply plate into engagement with said synchronizer plate in response to said controller, wherein said synchronizer plate is matable with said synchronizer cone upon said engagement with said apply plate to thereby synchronize the respective rotational speeds of said outer race of said first clutch and said apply plate to optimize the gear shifting efficiency of said automatic transmission.

11. The vehicle of claim 10, wherein said synchronizer cone is a single having a friction surface adapted to retard the rotation of said outer race when brought into contact with said synchronizer plate.

12. The vehicle of claim 10, wherein said synchronizer plate has a plurality of axially-extending synchronizer teeth and said apply plate has a plurality of axially extending apply teeth, said plurality of synchronizer teeth being mutually engageable with said plurality of apply teeth.

13. The vehicle of claim 10, wherein said outer race of said first clutch is adapted to serve as said hub of said dog clutch.

* * * * *